United States Patent

[11] 3,622,982

[72] Inventors Bradford S. Clark, Jr.
Derwood;
Alexander H. Frey, Jr., Gaithersburg, both of Md.
[21] Appl. No. 803,226
[22] Filed Feb. 28, 1969
[45] Patented Nov. 23, 1971
[73] Assignee International Business Machines Corporation
Armonk, N.Y.

[54] METHOD AND APPARATUS FOR TRIPLE ERROR CORRECTION
8 Claims, 4 Drawing Figs.

[52] U.S. Cl. 340/146.1
[51] Int. Cl. H04l 1/10
[50] Field of Search 340/146.1

[56] References Cited

UNITED STATES PATENTS 3,209,327 9/1965 Brandt 340/146.1
3,437,995 4/1969 Watts 340/146.1

OTHER REFERENCES

Hsiao, M. Y. Double-Error Correction in a Parallel Data Transfer System In IBM Tech. Disc. Bull. 12(4): p 590– 592 Sept. 1969 TK 7800. I 13.

*Primary Examiner*—Malcolm A. Morrison
*Assistant Examiner*—R. Stephen Dildine, Jr.
*Attorneys*—Hanifin and Jancin and Edward M. Suden

ABSTRACT: The invention relates to a simplified method for extracting triple error correction information from a (23, 12) Bose-Chaudhuri code which is the Golay code. In a 23-bit word having three or less errors, the method provides correction on a bit-by-bit basis. Each bit is assumed to be in error and corrected, the remaining 22 bits are then interrogated for two or less errors. Also disclosed is the apparatus for extracting the error correction information from the Golay code in a Bose-Chaudhuri code is comprised of a check word generator and shifting means, decoder circuitry, false error indication inhibit circuitry, control circuitry and error action circuitry.

INVENTORS
BRADFORD S. CLARK, JR.
ALEXANDER H. FREY, JR

BY Edward M. Suden

AGENT

METHOD AND APPARATUS FOR TRIPLE ERROR CORRECTION

BACKGROUND OF THE INVENTION

This invention herein described was made in the course of or under a contract with the United States Government.

1. Field of the Invention

This invention relates to subject matter having means for determining when signals indicative of intelligence, particularly in the form of a group, are transmitted or received without change and including means for correcting a determined change or error. More specifically, the invention relates to the correction of three errors in a group of 23 bits employing the Golay code.

2. Prior Art

The Golay code is a perfect code that corrects three or fewer errors in a word length of 23 bits. In a word 23 bits long, there is exactly $2^{11}$ unique combinations of three or less errors. The Golay code represents all possible error patterns in the 23 bits by $2^{11}$ unique error patterns.

It has been found that the Golay (23, 12) code can be embodied in the cyclic code such as the Bose-Chaudhuri code. Under such conditions, the 23-bit word is broken up into 12 data bits and 11 check bits or redundancy bits. A 12-data bit word is encoded to produce 11 addition check bits to make up a total word length of 23 bits. The data word is decoded at the receiver by means of a check word generator. The check word generator produces an 11-bit check word that is indicative of the error pattern within the data word length of 23 bits. The check word can therefore be decoded by comparing the check word to the $2^{11}$ unique error patterns which correspond to the $2^{11}$ different possible error combinations of three or less errors within a 23-bit word. If the 23-bit word has more than three errors then none of the $2^{11}$ unique patterns would be represented by the patterns in the check word generator; and therefore, no correction can be done. If, however, there were three or less errors in the 23-bit word, then the contents of the check word generator would be the same as one of the $2^{11}$ unique error patterns of the Golay code; and therefore, by identifying the contents of the check word generator, one can determine which ones of the 23 bits in the 23-bit word were in error; and, therefore, correct those bits in error.

The major problem in the prior art has been to find some simple means for extracting from a 23-bit word so encoded in the Golay code, the information as to which of the 23 bits are in error; if, in fact, there are three or less errors involved. The brute force approach would be to have a decoder made up of $2^{11}$ AND circuits, each AND circuit having 11 legs. It is clear that this would be an enormous amount of hardware.

With the knowledge that the Golay code can be embodied into a cyclic code, the characteristic of cyclic codes can be of great advantage. The cyclic code has allowed the decoder to be reduced from 1,024 AND circuits, each having 11 legs, to 276 AND circuits each having 11 legs. This is done by cycling the check word generator 23 times, which effectively allows each of the 23 bits to be individually interrogated for it being in error either alone or in combination with one or two other bits within the 23-bit word. The first stage of the check word generator after generating the check word is the equivalent of viewing all the error patterns associated with the first bit of the 23-bit word. If the first bit of the 23-bit word is an error, there is one unique error pattern that will appear in the check word generator; if the first bit is an error in combination with some second bit of the 23-bit word then there are 22 unique patterns that could exist in the check word generator; and, finally, if the first bit is an error in combination with the two other bits within the 23-bit word then there are 253 other unique error patterns that could appear in the check word generator. Therefore, there is a total of 276 distinct error patterns associated with three or less errors associated with one of the 23 bits. When any one of the unique error patterns is detected from the check word generator, then by knowing which of the bits is being reviewed at a given time, the error locations of each error is defined. It should be here noted that the state of the art is such, that the use of 276 AND circuits, each AND circuit having 11 legs, plus the necessary control circuit still makes the use of the Golay code for triple error correction impractical from a cost and hardware viewpoint.

It is, therefore, the object of this invention to provide a new method for extracting the error correction information from a 23-bit word encoded by the Golay code.

It is another object of the invention to provide a new apparatus which provides for the detection and correction of three or less errors of a 23-bit word coded by the Golay code and requires a substantial reduction in the amount of hardware heretofore needed in the prior art.

SUMMARY OF THE INVENTION

The invention relates to a new method for extracting the error correction information from a Golay code for correction of three or less errors in a 23 bit. The method interrogates each of the 23 bits to see if the bit being interrogated is in error alone or in combination with two or less other bits. If an error indication is indicated, then the bit being interrogated is corrected.

The method, therefore, embodies a concept that if the first bit is an error and there are three or less errors within the 23 bits that by correcting the first bit, then the number of errors are reduced to two or less. That is to say, that if there were three errors, that the errors are now reduced to two, if there were two errors, the errors were reduced to one; and if there was one error, the error is reduced to zero. If, of course, the assumption was erroneous, then if there were no errors, the number of errors was increased to one, if there was one error, then the number of errors was increased to two, if there were two errors, then the number of errors was increased to three; and if there were, in fact, three errors, the number of errors was increased to four. The method searches for indications of two, one or zero errors, and therefore, in the cases of which originally had two or more errors, the assumption being incorrect would yield results that would be unidentifiable. However, it can be seen that some ambiguity might exist where the assumption was erroneous and there was initially one or zero errors in the original 23 bits. It has been found, however, that the error indications that do appear, due to the erroneous assumption, are indicated at unique times during the interrogation and therefore, can be detected and ignored.

The method, briefly then, is to assume that the bit to be interrogated is an error and correct that bit, then to search the remaining 22 bits for two or less errors; if, in fact, two or less errors were found, and the error pattern was not identified as an erroneous error pattern due to an erroneous assumption with reference to the bit being interrogated, then the bit being interrogated was, in fact, in error and should be corrected in memory. The method calls for interrogating each of the 23 bits to see if the bit is, in fact, an error. A decision is only made as to whether the bit that is being interrogated is, in fact, an error and not where other errors might occur or be in the 23-bit word. It is by making this assumption and by ignoring where the other errors might exist, but rather whether they do exist, that allows for the reduction in the hardware of the novel apparatus for carrying out the method set forth above.

The apparatus for detecting the presence of three or less errors and providing means for correcting the three or less errors within the 23-bit word is basically comprised of a check word generator and shifting means, decoder circuitry, false indication inhibit circuitry, control circuitry and error action circuitry. The check word generator and shifting means creates the check word from the original 23 bits and provides means for shifting in a cyclic manner the check word. Means are also provided for complementing the first stage of the check word generator and for shifting the check word generator 23 times. This sequence of steps is called an interrogation cycle. It should be noted that there is one interrogation cycle for each bit position in the 23-bit word. During an interrogation cycle the decoder circuitry detects the presence of two or less ones in the check word generator. The false indication inhibit circuitry inhibits the output of the decoder if the presence of two or less ones in the check word generator is due to an erroneous assumption that the bit being interrogated during the interrogation cycle was in error; and, instead of correcting the error by complementing the first stage of the check word generator, an additional error was actually introduced. The control circuitry controls the cycle, and the shifting of the check word generator during an interrogation cycle as well as controlling the inhibiting means and the sampling of the error action circuitry. The error action circuitry provides means for correcting an error in the 23-bit word and for either returning or not returning the check word generator to its original state in accordance with whether the original assumption that the bit being interrogated was in error was or was not, in fact, correct.

After the 23rd interrogation cycle, the contents of the check word generator should be all zeros if, in fact, there originally existed three or less errors in the original 23-bit word.

BRIEF DESCRIPTION OF THE DRAWINGS

The foregoing and other objects, features and advantages of the invention will be apparent from the foregoing and more particular description of the preferred embodiments of the invention as illustrated in the accompanying drawings.

IN THE DRAWINGS

Figure 1:
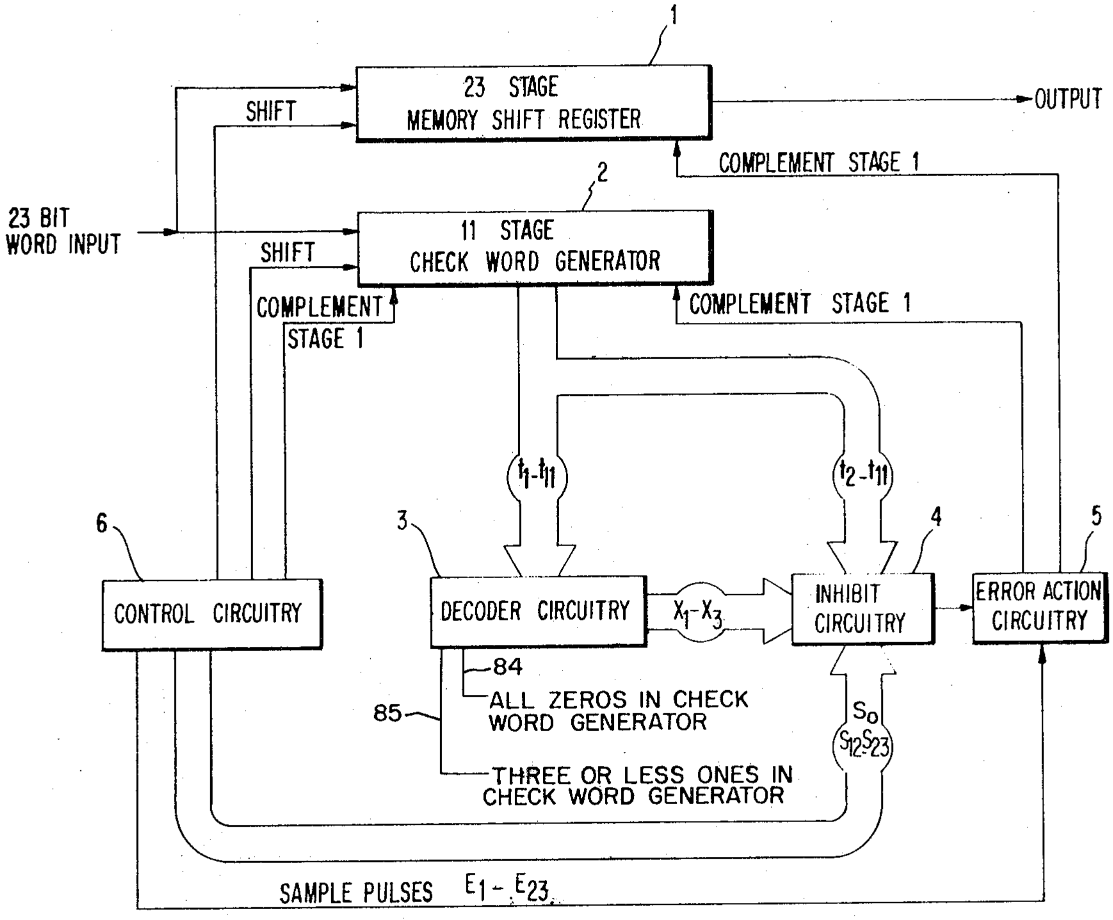

FIG. 1 shows a block diagram of the apparatus for detecting and correcting three or less errors within a 23-bit word encoded by the Golay code.

Figure 2:
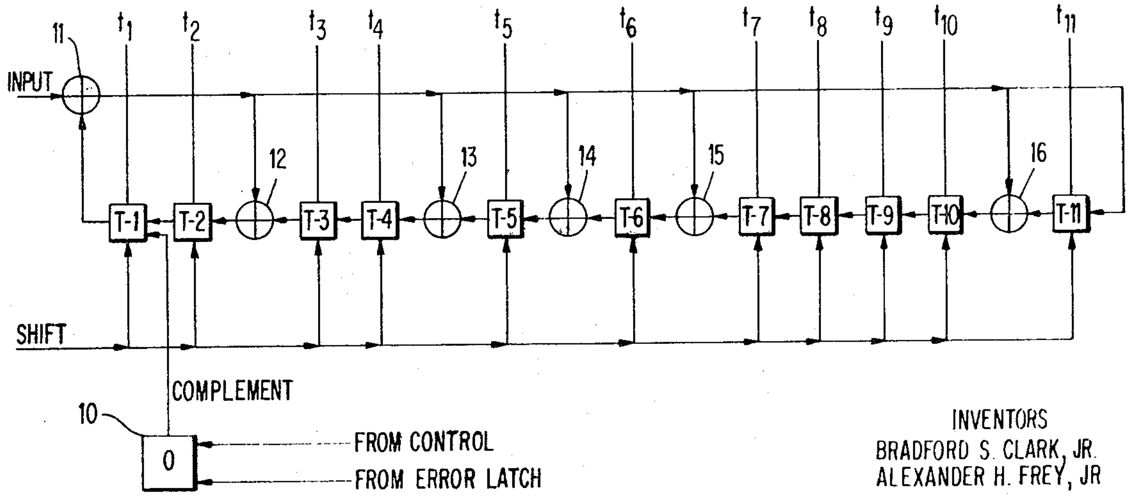

FIG. 2 is a logic diagram of the check word generator as shown in FIG. 1.

Figure 3:
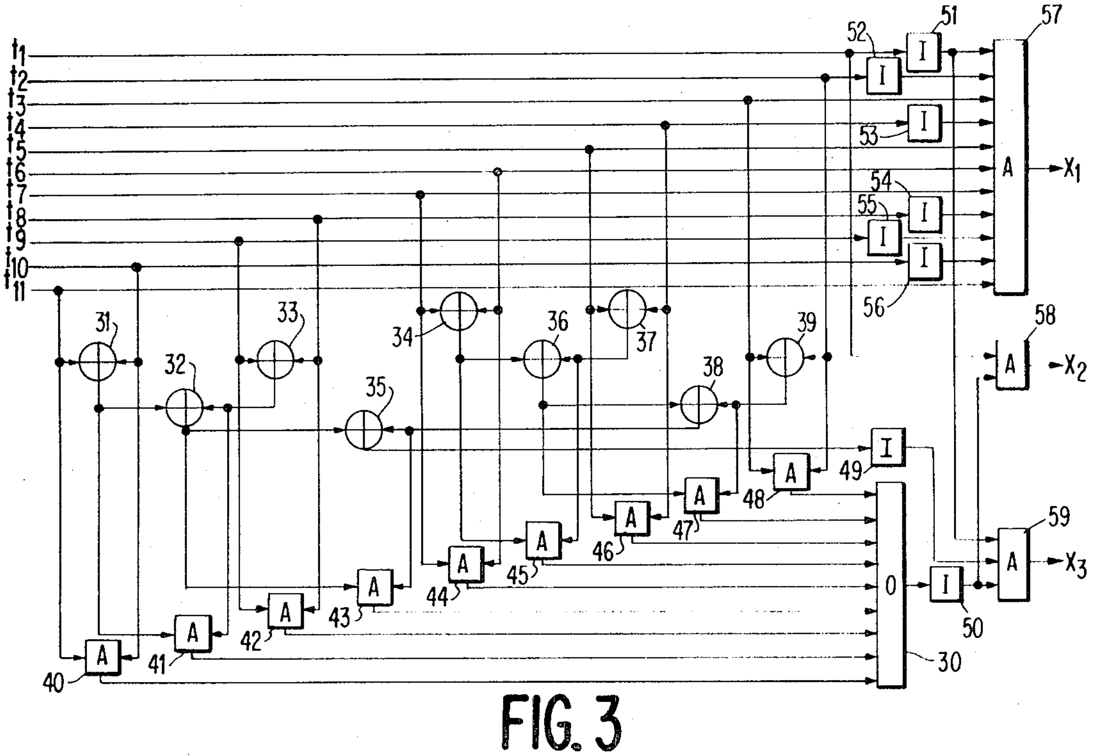

FIG. 3 shows the logic diagram of the decoder circuitry of FIG. 1.

Figure 4:
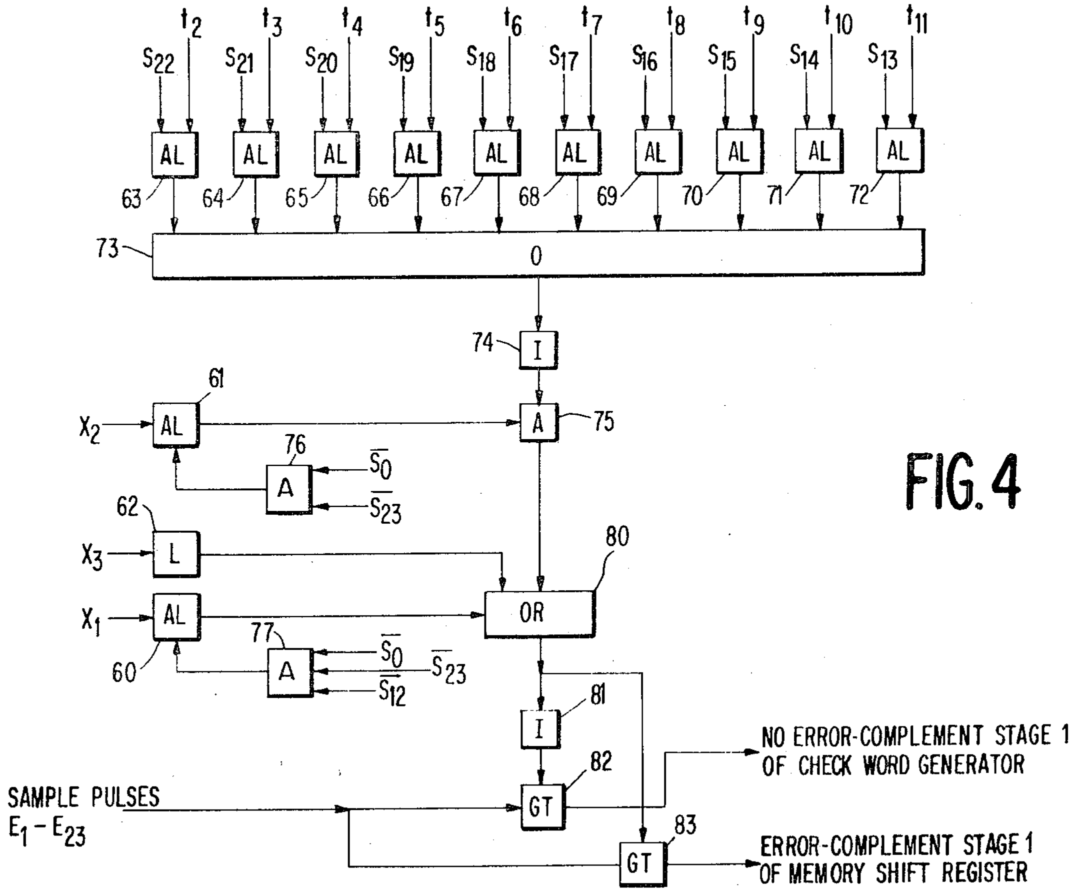

FIG. 4 shows the logic for the inhibit circuitry and the error action circuitry of the apparatus as shown in FIG. 1.

BRIEF DESCRIPTION OF THE INVENTION

METHOD

The method disclosed is for extracting the necessary intelligence from a (23,12) Golay code to allow the necessary error correction to be performed. The method, which calls for the use of the Golay code to be embodied within the well-known Golay and the Bose-Chaudhuri codes, can be readily found in W. Wesley Peterson's book entitled "Error-Correcting Codes", MIT Press, Cambridge, Mass. 1961.

The Golay codes provide for 2,048 ($2^{11}$) distinct error patterns for indicating the presence of three or less errors within the 23-bit word. It is well-known to embody the Golay code in the Bose-Chaudhuri code such that there exists 12 data bits and 11 redundancy bits within the 23-bit word. The procedure in the use of cyclic codes is to divide the incoming 23-bit word by the encoding polynomial to obtain a check word. Where the Bose-Chaudhuri code is, in fact, the Golay code, the resulting 11-bit check word will present the set of distinct error patterns that is associated with three or less errors in the original 23-bit word, if, in fact, three or less errors exist within the 23-bit word. The method of the invention encompasses the basic concept that if one is willing to draw intelligence as to whether a given bit is in error rather than trying to determine all possible detectable errors at the same time, then a tremendous reduction in amount of hardware and expense may be found. The method therefore calls for the checking of each bit of the 23-bit word to see if it was in error alone or in combination with two or less other bits. If these criteria are found, then the error bit is corrected in memory.

The method makes use of the characteristics of the Golay code when embodied within cyclic codes. One desirable characteristic is that the check word generator is a shift register and effectively looks at 11 bits of the 23-bit message at a time. In the Golay code, if there existed two or less errors within the 11 bits being represented within the check word generator at a given instance in time, there will exist two or less ones in the check word generator, all other positions of the check word generator being zero. Therefore, by shifting the check word generator 23 times, one effectively looks at 23 overlapping groups of 11 bits during each shift by noting whether there are two or less ones present in the check word generator during each shift.

There exists, however, one case which must be treated separately. It first must be realized that no two errors can be further apart than 11 bits. This is to say that if there is an error in position 1 of the 23-bit word, and an error in position 12 of the 23-bit word, that the two errors are 11 bits apart, and the two errors will never be in the check word generator at the same time; and since the code is cyclic, when bit 12 is in the first stage of the check word generator, the error that was associated with bit position 1 is effectively 12 bits apart. However, if there was error in bit position 1 of the 23-bit word and a second error in bit position 13 of the 23-bit word then the distance between the two errors is originally 12 bits long. It follows that when bit 13 is shifted into the first stage of the check word generator than, bit 1 is effectively 11 bits apart, and thus, these two errors will never be in the check word generator at the same time. Since the code is cyclic, if one could distinguish a distance between errors of 11 bits, then the special case of two errors within the 23-bit word could be detected.

There does exist within the Golay code a unique double error pattern that is associated with two errors which are 11 bits apart. Therefore, by sensing for the unique double error pattern and the condition of two or less ones within the check word generator all possible error combinations of two or less errors within the check word generator may be detected.

The method, therefore, calls for the systematic interrogation of each bit of the 23-bit message in the following manner:

1. Generate the check word in the check word generator.
2. The contents of the check word generator now represent bit positions 1 through 11 of the 23-bit word. Assume that there is an error associated with the first bit of the 23-bit word and correct this error by complementing the fist stage of the check word generator.
3. Shift the check word generator one position. The check word generator now will indicate error patterns associated bits 2–12 of the original 23-bit word.
4. Interrogate the contents of the check word generator for either the unique double error pattern representing an error in bit positions 2 and 13 of the original 23-bit word, and for the presence of two or less ones which would indicate two or less errors present within bit positions 2 through 12 of the original 23-bit word.
5. If the unique double-error pattern or two or less ones were present within the check word generator, then note such condition.
6. Steps 3, 4, and 5 are performed 22 more times.
7. Check to see if during any shift that the occurrence of the unique double-error pattern or the occurrence of two or less ones within the check word register was noted from the check word generator.
8. If such an occurrence was noted then bit 1 of the 23-bit word was, in fact, in error, and should be corrected. If no such occurrence was noted, then bit 1 of the 23-bit word was correct and should be recomplemented in the first stage of the check word generator. It should here be noted that after 23 skips, the check word generator has the original error pattern that it had after step 2. Steps 2 through 8 are interrogation cycles.
9. Shift the check word generator 1 position. This now brings bit positions 2–12 into the check word generator.
10. Repeat the interrogation cycle.
11. Repeat steps 9 and 10 until bit 1 is again represented in stage one of the check word generator.

12. Examine the contents of the check word generator for all zeros. If the check word generator is all zeros, then all error corrections that could be made have been performed. If the check word generator contains ones then there existed more than three errors within the original 23-bit word.

It should be noted, however, if one assumes that the given bit is an error, the assumption may be erroneous. If the assumption was erroneous, then the number of errors within the 23-bit word has been increased. This is to say, that if there were originally zero errors, there is now one error, if there originally was one error, there are now two errors, if there were originally two errors, there are now three errors; and finally, if there were three errors, there are now four errors. It should be noted, however, that since the decoder is only looking for two or less errors, then no pattern will be decoded for those situations where there were originally two or more errors. However, in the situation where there originally existed zero or one error, the increase to one and two errors respectively could cause a response from the detection circuitry, which would be false. It can be shown, however, that the occurrence of the single error or double error that was created by the erroneous assumption does occur at unique times within the interrogation cycle. These times are so unique that no true error indication for a single or double error appears in the check word generator at the times that are associated with the errors that would be induced due to an erroneous assumption. It can, therefore, be seen that the time of the cycle can be used to inhibit the output of the error detection circuitry for certain errors which are in reality false indications of the conditions that are being sensed for. A fuller explanation of the method can be obtained by reviewing the description of the apparatus which will follow.

APPARATUS

The apparatus for detecting and correcting the three or less errors in the 23-bit word encoded by the Golay code is shown in FIG. 1. It should be noted that for the ease of explanation, the use of a 23-bit storage memory shift register has been employed for storing the original 23-bit word. It is not to be contemplated that this invention is limited to this specific type of memory element, but rather it can be used with any memory device with the additional circuitry to make use of the information that is being given. The apparatus of the invention is directed towards obtaining the intelligence of where the error is and not in how the error is actually corrected within memory.

FIG. 1 shows a block diagram of the apparatus. The incoming word is inputted to the 23-stage memory shift register 1 for storing purposes. The 23-bit word input is also sent into an 11-stage check word generator 2 to generate the 11bit check word. The decoder circuitry 3, necessary to determine if the unique double error pattern or if two or less ones are present within the check word generator 2, is connected to the check word generator 2. Inhibit circuitry 4 also is connected to the check word generator 2, the decoder circuitry 3 and the control circuitry 6 for determining whether the indication from the decoder circuitry 3 is a true indication of the conditions or a fallacious error due to an erroneous assumption. The error action circuitry 5 provides means for outputting a signal, that is indicative of whether the bit being interrogated is in error or not, to the memory shift register 1 and to the check word generator 2. The control circuitry 6 supplies all the necessary shift signals, complement signals, and sample pulses. The control circuitry 6 also provides the necessary clock circuitry and counters to maintain control of the number of shifts in an interrogation cycle and the number of the interrogation cycles in checking a 23-bit word. The actual circuitry used within the control circuitry 6 is well known in the art, and it is felt that it is well within the art for one of average skill to build the necessary clocks, counters and distribution of timing signals to the rest of the circuitry such that the specific contents of the control circuitry will not be discussed any further.

FIG. 2 shows the 11-stage check word generator 2. The 11-stage check word generator 2 is one of a type that is well known in the art. The only difference between the prior art check word generators and the one shown in FIG. 2 is that the first stage T-1 of check word generator 2 is capable of being complemented. When the check word generator 2 is generating the check word from the 23-bit input word, the input to the exclusive OR 11 is the 23-bit input word. The generation of the actual check word by the sequential inputting of the 23-bits is well known in the art. A detailed description of the operation of the check word will not be discussed.

After the check word has been generated from the 23-bit word input, the input to the exclusive OR 11 is held at a zero value during all interrogation cycles. The output of the 11 stage T-1 through T-11 of the check word generator 2 is 11 output lines $t_1$ through $t_{11}$.

FIG. 3 shows the decoder circuitry 3 of the apparatus shown in FIG. 1. Decoder circuitry 3 has as its input the output $t_1$ through $t_{11}$ of the check word generator 2.

The unique Golay error pattern which is associated with two errors being 11 bits apart with the first bit being in the first position of the check word generator 2 is 00101110001. The use of inverters 51, 52, 53, 54, 55 and 56 and AND-circuit 57 is to sample the contents of the check word generator 2 for that unique double-error pattern. When an output is present on the output lines $X_1$ of AND-circuit 57, then the unique double-error pattern has been sensed in the check word generator 2 by decoder circuitry 3.

Exclusive OR-circuits 31, 32, 33, 34, 35, 36, 37, 38 and 39 form a detector which will have an output from exclusive OR 35 when there is an odd number of ones present on lines $t_2$–$t_{11}$. The output of exclusive OR 35 is inputted to inverter 49. Inverter 49 output will be positive when the number of ones present on lines $t_2$–$t_{11}$ is equal to an even number or zero. Decoder circuitry 3 also provides means for establishing if there exists less than two ones present on input lines $t_2$–$t_{11}$. The necessary circuitry to establish this condition is performed by OR-circuit 30 in combination with AND-circuits 40–48 and exclusive OR-circuits 31–34 and 36–39. Logic statements for the outputs of AND-circuits 40–48 can be found in table I.

TABLE I

| AND Circuit | Logic Statement |
|---|---|
| 40 | $(t_{11} \cdot t_{10})$ |
| 41 | $(t_{11}+t_{10}) \cdot (t_9+t_8)$ |
| 42 | $(t_9 \cdot t_8)$ |
| 43 | $(t_{11}+t_{10}+t_9+t_8) \cdot (t_2+t_3+t_4+t_5+t_6+t_7)$ |
| 44 | $(t_7 \cdot t_6)$ |
| 45 | $(t_7+t_6) \cdot (t_5+t_4)$ |
| 46 | $(t_5 \cdot t_4)$ |
| 47 | $(t_7+t_6+t_5+t_4) \cdot (t_3+t_2)$ |
| 48 | $(t_3 \cdot t_2)$ |

The output of OR-circuit 30 is the output of AND-circuits is 48 ORed together. By expanding the logic expression in table I, it can be shown that every possible combination of two ones appearing on lines $t_2$ through $t_{11}$ will cause an output from OR-circuit 30. The output of OR-circuit 30 is positive whenever there are more than two ones present on lines $t_2$–$t_{11}$. The output of OR-circuit 30 is fed to inverter 50. The output of inverter 50 is positive when there is less than two ones present on input lines $t_2$–$t_{11}$. AND-circuit 58 will have an output when there in a one present on input line $t_1$ and a positive output from inverter 50. Put more distinctly an output will exist on output line $X_2$ of AND-circuit 58 when there exists a one in the first stage of the check word generator 2 and all zeros or one other one in any of the remaining 10 stages T-2–T-11 of the check word generator 2.

AND-circuit 59 has as its inputs the output of inverter 51, which in turn has as its input the signal line $t_1$, the output of inverter 49 and the output of inverter 50. An output will appear on output line $X_3$ of AND-circuit 59 when there is a zero present on input line $t_1$, when the number of ones on input lines $t_2$ through $t_{11}$ is not odd and when the number of ones on input lines $t_2$–$t_{11}$ is less than two. It is clear, therefore, that an output can only exist on output line $X_3$ of AND-circuit 59 when all the input lines $t_1$–$t_{11}$ are all zero.

The decoder 3 decodes for the conditions stated in the method; that is, that the unique double-error correction is present which is the output of $X_1$ or that two or one ones are present in the check word generator 2 which is output $X_2$ or that no ones are present in the check word generator 2 which is output $X_3$. It should here be noted that while the method generally calls for the condition of two or less ones being present in the check word generator 2, that a tremendous amount of savings can be made in hardware by the implementation herein shown. Use is made of the fact that if two errors exist in the 11 bits that are being scanned during a given cycle in the check word generator 2, that there will exist in the check word generator 2, one or two ones with all other positions equal to zero. This pattern will continue and be shifted across the check word generator 2 until one error is indicated by a one in the first stage T-1 of the check word generator 2 and if there were two errors, then one of the errors would be in stage T-1 and one other error would be in one of the remaining 10 stages of the check word generator 2. It is necessary only to determine if one one existed on lines $t_2$–$t_{11}$ of the check word generator 2 and whether a one was present on the line $t_1$. All the error patterns that are present for zero, one, or two errors in the Golay code can be detected by the decoder circuitry 3. Output 84 of decoder 3 gives an indication after interrogation of the 23-bit word if the check word generator 2 contain all zeros, thus indicating that all error corrections possible have been performed.

FIG. 4 shows the inhibit circuitry 4 and the error action circuitry 5 of the apparatus that is set forth in FIG. 1. If the basic assumption that the bit being checked was an error could be fallacious, which in turn would cause a good bit to be changed into an error bit, which would be reflected in the Golay pattern. This would be specifically a problem where there originally existed no errors or one error in the 23-bit word. It has been found that the occurrence of these false indications occur at unique times such that they cannot be confused with true error indications. It is, therefore, necessary at this time to discuss the possible cases of obtaining true and false error indications from the decoder circuitry 3.

The first case to be investigated is where there are no errors in the 23-bit word; and therefore, the check word in the check word generator 2 is all zeros. After complementing the first bit of the check word generator 2 in the attempt to correct an hypothesized error, we have, in fact, generated an error. The error pattern in the check word generator 2 is 10000000000 which will be recognized as a valid error pattern by the decoder circuitry 3. Further, after 23 shifts of the check word generator 2 during the interrogation cycle, the same pattern will again appear and again will be interpreted by the decoding circuitry 3. Therefore, false errors will be sensed at times $S_0$ and $S_{23}$.

The second case to be investigated is where there exists one error in the 23-bit word and the error is in the first bit of the 23-bit word. The contents of the check word generator 2 will be 10000000000. And after the complementing of stage 1 on the assumption that the bit was, in fact, in error, the contents of the shift register will be all zeros. The all zero state of check word generator 2 will be recognized by decoder 3 and an output will be generated on output line $X_3$ of decoder circuit 3. This output is a true indication. It should further be noted that there is no way in which a false indication may be had on output line $X_3$ of the decoder circuitry 3.

The third case to be investigated is where one error exists and the error is located in bits 2 through 11 of the 23-bit word. The error pattern within the check word generator 2 will be all zeros except for a one occurring in the check word generator 2 stage that corresponds to the bit position that was in error in the 23-bit word. In complementing the first stage of the check word generator 2, we create a second error which will be immediately recognized by the decoder circuitry 3 at time $S_0$. Further, after 23 shifts the same error pattern will again be decoded by the decoder circuitry 3 at time $S_{23}$ and an output will appear on output line $X_2$. Therefore, it should be noted that false indications of double errors can be obtained prior to any shifting, that is at time $S_0$, and after the 23rd shift which is time $S_{23}$.

The fourth case to be investigated is where there is one error which is in bit 12 of the 23-bit word. When the first stage of the check word generator 2 is complemented, the error pattern within the check word generator 2 will be the unique double error pattern that is associated with two errors being 11 bits apart. Here again, the decoder circuitry 3 will immediately recognize the error pattern in the check word generator 2. And, once again, after the 23rd shift the same error pattern will appear in the check word generator 2 and again be decoded by decoder circuitry 3 and an output will be generated on output line $X_1$. It should, therefore, be noted that an erroneous output can appear for unique double-error patterns at times $S_0$ and $S_{23}$.

The fifth case to be examined is where one error exists in bit 13 of the 23-bit word. Upon complementing the contents of the check word generator 2 the error pattern that is present in the check word generator 2 will not be recognized by decoder circuitry 3. However, after 12 shifts at time $S_{12}$, the 13th bit of the 23-bit word will be in the first stage of the check word generator 2 and the created error in the first bit of the 23-bit word will be the next bit to be entered into the check word generator 2. Therefore, it can be seen that the two errors are 11-bits apart and the error pattern within the check word generator 2 will so indicate this and the unique double error pattern will be present. Therefore, it should be noted that the unique double-error pattern sensed at time $S_{12}$ is fallacious.

The sixth case to be investigated is where one error exists in bits 14–23 of the 23-bit word. An output will be obtained on output line $X_2$ of decoder circuitry 3.

TABLE II

| Bit in Col. | Time | Check Word Generator |
|---|---|---|
| 14 | S13 | 10000000001 |
| 15 | S14 | 10000000010 |
| 16 | S15 | 10000000100 |
| 17 | S16 | 10000001000 |
| 18 | S17 | 10000010000 |
| 19 | S18 | 10000100000 |
| 20 | S19 | 10001000000 |
| 21 | S20 | 10010000000 |
| 22 | S21 | 10100000000 |
| 23 | S22 | 11000000000 |

The specific times for the specific error pattern in the check word generator 2 associated with an error associated with positions 14–23 is indicated in table II. These are the false error patterns.

The seventh case to be investigated is where there are two errors in the 23-bit word with one error being in the first bit position and the other error being in one of the remaining 22-bit positions of the 23-bit word. Therefore, when the first stage of the check word generator 2 is complemented, an error is corrected and the number of errors within the check word generator 2 is reduced from two to one. An error pattern of 10000000000 will appear during times $S_1$ through $S_{22}$ to indicate that such an error has been encountered. These are true error indications and it should be noted that no true error indication of the above error pattern appears at times $S_0$ or $S_{23}$.

The eighth case to be investigated is where two errors exist in bit positions 2 through 23 of the 23-bit word and by complementing the contents of the check word generator 2 an additional error is created. Under these conditions, no error pattern will be recognized by the decoder circuitry 3 and therefore no fallacious error indications can be transmitted.

The ninth case to be investigated is where three errors exist in shift register positions 2–23 and a fourth error is created by the complementing of the first stage of the check word generator 2. Here again, the error patterns that will be obtained will not be decoded by the decoder circuitry 3; and therefore, once again, no fallacious indication will be given by error detection circuitry 3.

The tenth and final case to be investigated is where three errors exist in the 23-bit word with one of the errors being in the first bit position of the 23-bit word. Therefore, by complementing the first stage of the check word generator 2, an error is removed and a number of errors represented by the check word will be reduced from three to two. It can be shown that all combinations of two ones in the remaining 22 bits will be detected by the detection circuitry 3 during the 23 shifts. It should be noted, however, that the error patterns that exist in cases 3, 4, 5 and 6 for double errors cannot be duplicated by any true error. True double-error correction and fallacious double-error correction are exclusive subsets of the total double-error correction set and can be therefore separated.

Turning to FIG. 4, the necessary inhibit circuitry 4 can be seen. The three outputs from the decoder circuitry 3 are fed into three latch circuits in the inhibit circuitry 4. The latch circuits for outputs $X_1$ and $X_2$ are AND latch circuits. An AND-latch circuit is a circuit which is conditioned upon the occurrence of two events and remains on after the input signals are gone. This type of AND latches is well known in the art and will not be described in detail here.

It should first be noted that the output on line $X_3$ of the decoder circuitry 3 is fed to latch 63. In accordance with the prior discussion of the 10 possible cases, it should be noted that this output line need never be inhibited.

The output line $X_2$ of the decoder circuitry 3 represents an error in the first position only of the check word generator 2 or an error in the first position of the check word generator 2 and one other error in the remaining 10 positions of the check word generator 2. As was shown by the first and third cases, outputs which appeared on line $X_2$ during times $S_0$ and $S_{23}$ are fallacious; and therefore, should be inhibited. Thus, the AND-latch circuit 61 is prevented from being latched if the indication from the decoder circuitry 3 occurs at time $S_0$ or time $S_{23}$.

As was shown by case 6, the double-error patterns existing at specific times can give erroneous results. AND-latch circuits 63–72 interrogate for the existence of such conditions. Since only one of these conditions may reasonably exist during any interrogation cycle, the output of the AND latches 63 through 72 are ORed together by OR-circuit 73. The effect of setting the AND-latch 61, by means of response on line $X_2$ not occurring at times $S_0$ or $S_{23}$, is negated if any one of the latches 63–72 are set. Therefore, the output of AND-circuit 74 can only be positive when an output is generated on line $X_2$ of the decoder circuitry 3 and the cases as described in cases 1, 3 and 7 are not true.

The output line $X_1$ from decoder circuitry 3 is connected to AND-latch 60. AND-latch 60 will latch if the output is sensed on output line $X_1$ during times other than $S_0$, $S_{12}$, or $S_{23}$. This is done because of cases 4 and 5 previously discussed.

The output of AND-latches 60 and 61 and latch 62 are ORed together by OR-circuit 80. The output of OR-circuit 80 is the output of the inhibit circuitry 4. The only time an output will be sensed on the output of OR-circuit 80 is when a valid condition is met, that is the unique double-error pattern was sensed or two or less ones were found to be contained within the check word generator 2.

The error action circuitry 5 is comprised of inverter 81 and gates 82 and 83. After the 23rd shift has been completed, which returns the check word generator 2 to its original state, one sample pulse $E_1$–$E_{23}$ is generated. $E_1$ being representative of the first bit, $E_2$ being representative of the second bit, and so on. The sample pulse is generated by the control circuitry 6 and strobes gates 82 and 83. If there was no error in the bit position being checked then the sample pulse will pass through gate 82 and will recomplement the first stage of the check word generator 2. If there was an error, then the sample pulse will pass through gate 83 and will complement that bit as an error. In our given example, the output of gate 82 will complement the first stage of the memory shift register 1. The memory shift register 1 will then be shifted, shifting the next bit to be interrogated into the first stage and the interrogation of the next bit will follow the method employed to check the first bit.

It should here be realized that the foregoing discussion described the 10 possible combinations with the first 11 bits of the 23-bit word being represented by the check word generator 2. However, since the code is a cyclic code, if the first bit of the 23-bit word is a matter of arbitrary reference, by shifting the shift register once, bit two of the 23-bit word now becomes bit one and all the same rules and discussion that applied to the original bit one of the 23-bit word apply.

It should be here noted that since the 23-bit word is composed of 12 data bits, in most cases it is only desirable to correct the data bits. Therefore, the correction can be terminated after the 12th bit has been interrogated. If there were three or less errors in the 23 bits, then any error that occurred in the first 12 bits has been corrected. This is indicated by output 85 of decoder 3 which indicates three or less ones in the check word generator 2 after the 12th bit has been interrogated. In order to determine if successful correction has occurred, all that one needs to do is to shift the check word generator 2 one more time such that the 11 bits represented by the contents of the check word generator 2 are the 11 check bits (Bits 12–23 ). Under these conditions a number of ones that exist in the check word generator 2 are counted. If the number of ones in the check word generator 2 is equal to three or less, then the data bits are correct. However, if the number of ones in the check word generator 2 is greater than three, then it must be assumed that the 12-data bits are still in error.

In summary, a general review of one complete operation of the apparatus will here be presented. After the 23-bit word has been stored in the memory shift register 1 and the check word has been generated in the check word generator 2, the process of extracting the necessary correction information from the check word is begun. The contents of the check word generator 2 corresponds to bits 1–11 of the 23-bit word. The first stage of bit 1 is complemented on the assumption that it was in error. The check word generated 2 is then shifted 23 times, which will return the contents to the check word generator 2 to its original value. The decoder circuitry 3 monitors the contents of the check word generator 2 and will provide an output of the unique double-error pattern indicative of the two errors being exactly 11 bits apart appear or if the contents of the check word generator 2 should have two or less ones. The output of the decoder circuitry 3 is fed into the inhibit circuitry 4 where it is stored by means of latches and after the 23rd shift the output of the inhibit circuitry 4 will have an output if the decoder circuitry 3 detected one of the conditions previously stated and if those conditions were not fallacious. The control circuitry 6 then generates a first sample pulse which samples the error action circuitry 5, which if no error was found, will recomplement the first stage of the check word generator 2; and if an error was found, will complement the first bit of the 23-bit word. The check word generator 2 is then shifted one position, and will have bits 2–11 represented by the check word. The first stage of the check word generator 2 is then complemented. The check word generator 2 is again shifted 23 times with the decoder circuitry 3 monitoring its contents to determine if one of the conditions has occurred. Once again, the inhibit circuitry 4 inhibits any false indications. The error action circuitry 4 provides a pulse that will either correct the would be error in the second position of the data word or recomplement the first position of the check word generator 2.

The check word generator 2 is then shifted one position such that the contents of the check word generator 2 are bits 3–14, and the first stage is complemented. The cycle is continued for the third bit and for all the remaining bits until the 23rd bit has been in a similar manner interrogated. At this time, the check word generator 2 should contain all zeros. This would indicate that if three or less errors did exist, that the three or less errors were corrected. If, however, ones still remain in the check word generator 2 then the 23 bits must still be considered to have errors.

While the invention has been particularly shown and described with references to preferred embodiments thereof, it will be understood by those skilled in the art that various changes in form and detail may be made therein without departing from the spirit and scope of the invention.

What is claimed is:

1. An apparatus for detecting and correcting less than four errors in a 23-bit coded word, said coded word being encoded in a cyclic (23, 12) Golay code, said apparatus determining whether each bit of said 23 bits is in error alone or in combination with less than three other bits of said 23 comprising:

a storage means for storing said coded word;

an 11 stage check word generator for generating a check word from said coded word;

a control means for cycling an interrogation cycle for said check word by shifting said check word one bit after each of said interrogation cycles, for causing the first stage of said check word generator to be complemented at the beginning of each of said interrogation cycles, for shifting said check word 23 times during each of said interrogation cycles, the cycle number "*n*" being indicative of the bit of said 23 bits being interrogated for error;

a detecting means for detecting and storing the occurrence of less than three valid errors in said check word generator during any one of said 23 shifts of said check word generator caused by said control means;

an error action means for generating a first and second output after the 23rd shift of said control means, said first output being generated if said detecting means detected less than three valid errors and correcting bit "*n*" in said storage means, said second output being generated if said detecting means detected more than two valid errors, said second output complementing the first stage of said check word generator.

2. An apparatus as set forth in claim 1 wherein said detecting means comprises:

a first means for generating a third output when there is all zeros in said check word generator upon the completion of the 23 cycles of said control means, said third output indicating that said coded word has been successfully corrected.

3. An apparatus as set forth in claim 1 wherein said detecting means comprises:

a second means for generating a fourth output when the contents of said check word generator is the unique double-error pattern;

a third means for generating a fifth output when the contents of said check word generator contains a one in said first stage of said check word generator and less than two ones present in the remaining 10 stages of said check word generator;

a fourth means for generating a sixth output when the contents of said check word generator is all zeros;

a fifth means for inhibiting said fourth output of said second means at times when said fourth output would be erroneous due to the operation of said control means having complemented said first stage of said check word generator;

a sixth means for inhibiting said fifth output of said third means at times when said fifth output would be erroneous due to the operation of said control means having complemented said first stage of said check word generator;

a memory means responsive to the first occurrence of said fourth, fifth or sixth outputs.

4. An apparatus as set forth in claim 3 wherein said third means comprises:

a greater than one detector for generating a seventh output when there is more than one one in the last 10 stages of said check word generator:

a first inverter for inverting said seventh output of said greater than one detector;

a first AND circuit having a first input from said first stage of said check word generator and a second input from said first inverter, the output of said first AND circuit being said fifth output; and said fourth means comprises:

an odd number detector for generating an eighth output when there is an odd number of ones in the last 10 stages of said check word generator;

a second inverter for inverting the output of said odd number detector;

a third inverter for inverting the output of said first stage of said check word generator;

a second AND circuit having a third input from said second inverter, a fourth input from said third inverter and a fifth input from said first inverter of said third means, the output of said second AND circuit being said sixth output.

5. An apparatus as set forth in claim 1 wherein:

said control means controls only 12 of said 23 cycles, and a seventh means for generating a ninth output when the contents of said check word generator has less than four ones upon the completion of said 12th cycle of said control means, said ninth output indicating that the first 12 bits of said 23 bits have been successfully corrected.

6. A method for detecting and correcting less than four errors in a 23-bit coded word in a bit stream, said coded word being encoded in a cyclic (23, 12) Golay code, said method determining whether each bit of said 23 bits is in error alone or in combination with less than three other bits of said 23 bits, comprising the steps of:

storing said coded word;

generating a check word from said coded word;

sequentially determining whether each bit of said coded word is in error alone or in combination with less than three other errors in the remaining 22 bits of said check word by performing an interrogation cycle for each of said bits, said interrogation cycle comprising the steps of:

complementing the first bit of said check word under the assumption that the bit under interrogation is in error, detecting the presence of less than three valid errors in the modified check word, correcting the bit under interrogation in said stored coded word if less than three valid errors were detected in said modified check word.

recomplementing the [illegible]t bit of said check word if less than three valid errors [illegible]e not detected in said modified check word.

7. A method as set forth in claim 6 comprising the further step of:

detecting if the check word has a value of all zeros after the last bit of said coded word has been interrogated for errors by said interrogation cycle, and generating an output signal that will indicate successful correction of said coded word.

8. A method as set forth in claim 6 wherein the step of sequentially determining the status of each bit of said coded word by an interrogation cycle is only performed for the first 12 bits of said coded word, and further comprises the step of detecting if the check word has less than four errors in the remaining 11 bits of said check word that have not been interrogated, and generating the output signal that will indicate successful correction of said first 12 bits of said coded word if less than four errors was detected in the remaining 11 bits of said coded word.

* * * * *

PO-1050
(5/69)

UNITED STATES PATENT OFFICE
CERTIFICATE OF CORRECTION

Patent No. 3,622,982 Dated November 23, 1971

Inventor(s) Bradford S. Clark, Jr. et al.

It is certified that error appears in the above-identified patent and that said Letters Patent are hereby corrected as shown below:

Column 6, line 59, before "48" please insert--40--.

Column 11, line 20, Claim 1, after "23" please insert--bits,--.

Signed and sealed this 13th day of June 1972.

(SEAL)
Attest:

EDWARD M.FLETCHER,JR.
Attesting Officer

ROBERT GOTTSCHALK
Commissioner of Patents